United States Patent
Tian et al.

(10) Patent No.: US 12,087,457 B2
(45) Date of Patent: Sep. 10, 2024

(54) MULTI-LOOP NATURAL CIRCULATION EXPERIMENTAL DEVICE UNDER SIX-DEGREE-OF-FREEDOM MOTION CONDITIONS AND METHOD THEREFOR

(71) Applicant: Xi'an Jiaotong University, Shaanxi (CN)

(72) Inventors: Wenxi Tian, Shaanxi (CN); Zhixian Lai, Shaanxi (CN); Mingjun Wang, Shaanxi (CN); Chong Chen, Shaanxi (CN); Zhiming Zhu, Shaanxi (CN); Jing Zhang, Shaanxi (CN); Suizheng Qiu, Shaanxi (CN); Guanghui Su, Shaanxi (CN)

(73) Assignee: XianJiaotongUniversity, Shaanxi (CN)

( * ) Notice: Subject to any disclaimer, the term of this patent is extended or adjusted under 35 U.S.C. 154(b) by 370 days.

(21) Appl. No.: 17/570,607

(22) Filed: Jan. 7, 2022

(65) Prior Publication Data

US 2022/0130562 A1 Apr. 28, 2022

(30) Foreign Application Priority Data

Jan. 11, 2021 (CN) .......................... 202110029094.5

(51) Int. Cl.
*G21C 17/00* (2006.01)
*G21C 17/022* (2006.01)
*G21C 17/112* (2006.01)

(52) U.S. Cl.
CPC ......... *G21C 17/001* (2013.01); *G21C 17/022* (2013.01); *G21C 17/112* (2013.01)

(58) Field of Classification Search
CPC ... G21C 17/001; G21C 17/022; G21C 17/112
USPC ............................................................. 73/147
See application file for complete search history.

(56) References Cited

FOREIGN PATENT DOCUMENTS

CN          109696295 A   *   4/2019   ............ G01M 10/00

OTHER PUBLICATIONS

CN 109696295 A (Year: 2019).*

* cited by examiner

*Primary Examiner* — Alexander A Mercado
*Assistant Examiner* — Rodney T Frank

(57) ABSTRACT

A multi-loop natural circulation experimental device under six-degree-of-freedom motion conditions and a method therefor are provided. The device includes: a six-degree-of-freedom motion simulation platform; a multi-loop main circulation loop including a serpentine pre-heater, an experimental section, two sleeve-type condensers, and a pressurized circulating pump, a voltage stabilizer and related equipment; and a cooling water system including a sleeve condenser, a plate heat exchanger, a cooling tower, a cooling fan, a cooling water tank and related equipment; and an electric heating system including a DC power supply, a low voltage power controller and a transformer. The present invention also provides an experimental method of the device.

7 Claims, 2 Drawing Sheets

MULTI-LOOP NATURAL CIRCULATION EXPERIMENTAL DEVICE UNDER SIX-DEGREE-OF-FREEDOM MOTION CONDITIONS AND METHOD THEREFOR

CROSS REFERENCE OF RELATED APPLICATION

The present application claims priority under 35 U.S.C. 119(a-d) to CN 202110029094.5, filed Jan. 11, 2021.

BACKGROUND OF THE PRESENT INVENTION

Field of Invention

The present invention relates to the technical field of nuclear power equipment performance verification experimental research under sports conditions, and specifically relates to a multi-loop natural circulation experimental device under six-degree-of-freedom motion conditions and a method therefor.

Description of Related Arts

In nuclear reactors, natural circulation refers to the circulating flow caused by the difference in the density of fluids between the cold and hot sections of a closed loop. Natural circulation can passively assist the removal of residual heat from the core when the reactor is shut down without providing any external driving force. Therefore, in the event of an accident such as a power outage of the entire plant, the reactor core can be effectively cooled to ensure the safety of the reactor core, which plays a major role in the safety of the reactor.

Ships and nuclear-powered platforms on the sea are affected by wind and waves, and the hull will have six degrees of freedom motion and its coupled motion, such as tilt, sway, and heave. Ocean motion conditions will bring additional inertial force to the reactor coolant system, making the flow and heat transfer characteristics of the coolant in the loop more complicated.

Different nuclear power systems often use different cooling loop arrangements. Common ones include the symmetrical arrangement of double-loops, the asymmetrical arrangement of double-loops with a certain angle, and the symmetrical arrangement of three-loops. In a multi-loop natural circulation system, there are complex flow phenomena between the loops, such as partial loop circulation, inner and outer loop circulation, and these flow phenomena change with the relative direction of the additional inertial force of ocean motion and the natural circulation system. Therefore, it is very necessary and important to conduct experimental research on the characteristics of multi-loop natural circulation under ocean motion conditions.

The multi-loop natural circulation experiment under six-degree-of-freedom motion conditions mainly studies the flow and heat transfer characteristics of the coolant under the ocean motion conditions of the multi-loop natural circulation loop, as well as the flow relationship between the loops, and the local flow phenomenon. Therefore, the experimental system has high requirements for the six-degree-of-freedom motion simulation ability, the simulation ability of different nuclear power plants, and the error control level. It needs to be able to simulate typical ocean conditions such as tilt, sway, heave, accelerated linear motion, and coupled motion; the relative position between the loops can simulate the natural circulation loops of different nuclear power systems; it can avoid the error caused by the six-degree-of-freedom motion condition to the measuring instrument.

A Chinese patent application with a publication No. of CN111210920A discloses a test device that simulates the natural circulation circuit of marine nuclear reactor fluid. The device includes a rocking table and a natural circulation circuit system. The rocking table adopts a hydraulic drive mode. However, all of its experimental devices are fixed on the table, and the local components cannot be flexibly changed in orientation, and are only used for research under rocking conditions, without achieving six-degree-of-freedom motion simulation; the cooling loop is symmetrically arranged, and the relative included angle and angle cannot be changed. The location cannot simulate the common asymmetrical arrangement of nuclear power systems.

SUMMARY OF THE PRESENT INVENTION

An object of the present invention is to provide a multi-loop natural circulation experimental device under six-degree-of-freedom motion conditions and a method therefor in response to the above-mentioned experimental device or experimental system that is not applicable or does not meet the needs of the nuclear engineering field for verification experimental research on the performance of nuclear power equipment under motion conditions. The experimental device of the present invention can realize six-degree-of-freedom motion and coupled motion simulation; two cooling loops can change the relative position to simulate the natural circulation loops of different nuclear power systems; the heating can be changed according to demand Segment orientation to reduce errors caused by motion simulation.

In order to achieve the above objective, the present invention adopts the following technical solutions.

A multi-loop natural circulation experimental device under six-degree-of-freedom motion conditions, comprises: a six-degree-of-freedom motion simulation platform, a multi-loop main circulation loop, a cooling water system, and an electric heating system; wherein:

the six-degree-of-freedom motion simulation platform comprises a mechanical platform, a driving system and a control system;

the multi-loop main circulation loop comprises a serpentine preheater 4, an experimental section 1, a pressurized circulating pump 7, a voltage stabilizer 6, an electromagnetic flowmeter 5, an exhaust valve 14, and two sleeve-tube condensers 15; wherein the serpentine preheater 4, wherein the experimental section 1, and the pressurized circulating pump 7 are fixed to the six-degree-of-freedom motion simulation platform through a truss structure on the mechanical platform; arc-shaped guide rails 17 are fixed on the truss structure, and the two sleeve-tube condensers 15 are respectively fixed on the arc-shaped guide rails 17, and an ascending section and a descending section of the multi-loop main circulation loop are respectively connected to an inlet and an outlet of the two sleeve-tube condensers 15 through a T-shaped three-way 16 and hoses, forming two cooling circuits of the multi-loop main circulation loop; the experimental section 1 is connected to the ascending section of the multi-loop main circulation loop through a rotating insulating flange 22, the serpentine preheater 4, the ascending section and the descending section are respectively welded and connected, the pressurized circulating pump 7 and the exhaust; the exhaust valve 14 is connected with the entrance of the descending section, the voltage stabilizer 6 is connected with the entrance section of the serpentine preheater 4, and the electromagnetic flowmeter 5 is installed in the entrance section of the serpentine preheater 4;

the cooling water system comprises the two sleeve-tube condensers 15, a plate heat exchanger 13, a cooling tower 11, a cooling fan 12, a cooling water tank 10, a circulating pump, and an electromagnetic flowmeter; wherein two cooling water channels of the two sleeve-tube condensers 15 are connected in series with stainless steel hoses and connected to a primary side of the plate heat exchanger 13 to form an indoor part of the cooling water system; a secondary side of the plate heat exchanger 13 is connected with the cooling water tank 10 and the cooling tower 11 to form an outdoor part of the cooling water system; the cooling fan 12 is installed inside the cooling tower 11; the indoor and outdoor parts of the cooling water system are respectively installed with an electromagnetic flow meters, a gate valve and a circulating pump;

the electric heating system comprises: a DC power supply 2, a low-voltage power controller, and a transformer 3; wherein the DC power supply 2 is fixed on the upper table 8 of the mechanical table and outputs constant power to the experimental section 1, an input end of the transformer 3 is connected with the low-voltage power controller, and the output end is connected with the serpentine preheater 4 to output constant power to the preheater 4.

Preferably, the mechanical table of the six-degree-of-freedom motion simulation platform comprises an upper table 8 and a lower base 9; the drive system comprises six telescopic cylinders 23 and joint hinges 24; wherein the telescopic cylinders 23 adopts servo driven by a motor, it is arranged in parallel, and the two ends are respectively connected with the upper table 8 and the lower base 9 through the joint hinges 24; six degrees of freedom movement of the upper table 8 is achieved through the telescopic movement of six telescopic cylinders 23.

Preferably, the indoor part of the cooling water system is fixed on a six-degree-of-freedom motion simulation platform and is connected to the outdoor part through a stainless steel hose; the entire natural circulation experimental device including cold and heat sources is in motion during an experiment.

Preferably, the two sleeve-tube condensers 15 are capable of changing orientation on the arc-shaped guide rail 17, thereby changing an angle between the two cooling loops.

Preferably, the two cooling circuits are respectively equipped with resistance adjusting valves 18, which is capable of setting different resistance working conditions for the two cooling circuits, and realizing partial loop operation between the two cooling circuits.

Preferably, the experimental section 1 is a circular tube experimental section, which is directly energized and heated by the DC power supply 2, and the power control sensitivity is high; thermocouples 21 are arranged at equal intervals on the wall surface of the experimental section 1 every 100 mm to measure temperatures of the wall is measured by inserting a thermocouple at the center of the inlet and outlet to measure the temperature of the fluid to monitor the state of the fluid and the wall surface in the experimental section in real time; a pressure tube 19 set on the experimental section is equipped with an insulating flange 20 to avoid the cause and experiment, the experimental section 1 forms a parallel circuit and is heated by the DC power supply 2; the experimental section 1 is capable of rotating the experimental section around its central axis through a rotating insulating flange 22, and so as to change impulse pressures according to the different forms of motion orientation of the pressure tube 19 to reduce influence of additional pressure drop.

An experimental method of the multi-loop natural circulation experimental device under six-degree-of-freedom motion conditions is further provided, wherein before start of an experiment, performing water filling leak detection and pressure resistance experiments on the multi-loop main circulation loop and the cooling water system to ensure that the loop does not leak under high flow and high pressure conditions;

before start of the experiment, turning on the pressurized circulating pump 7 and the exhaust valve 14 to exhaust the gas in the multi-loop main circulation loop, and keeping all the working fluids in the multi-loop main circulation loop as single-phase water; then turning off the exhaust valve 14, disconnecting the pressurized circulating pump 7, adjusting the voltage stabilizer 6, so that the pressure of the multi-loop main circulation loop is the experimental target working condition pressure;

adjusting positions of the two sleeve-tube condensers 15 and the resistance adjusting valves 18 of the cooling circuits to make the angle and resistance of the two cooling circuits the experimental target conditions;

when turning on the cooling water system, keeping the gate valves of the indoor and outdoor parts of the cooling water system turned on, respectively turning on the circulating pumps of the two parts, and turning on the cooling fan 12 to accelerate the cooling of the fluid in the cooling tower 11;

while turning on the electric heating system, gradually increasing heating power of the experimental section 1 and the preheater 4 gradually, and each increase in power ensures that the wall temperature rise of the experimental section 1 does not exceed 15° C., after a flow rate of a wall temperature and a multi-loop main circulation loop is stable, performing a next power-up operation until the temperature of the inlet fluid of the experimental section 1 reaches an experimental target working condition temperature;

when turning on the six-degree-of-freedom motion simulation platform, ensuring that a reference of each telescopic cylinder is calibrated, turning on the power of the drive motor, entering the motion simulation control system, and raising the mechanical platform to a certain height to leave enough space for the simulation of various subsequent motions, setting experimental target of motion conditions for motion simulation.

Compared with the conventional art: the present invention has the following advantages:

1. The experimental system and method of the present invention realize the experimental research on the characteristics of multi-loop natural circulation under the condition of six degrees of freedom movement. Through the telescopic movement of six telescopic cylinders, tilt in any direction can be achieved, along with the x, y, and z axes. The translational motion and the rocking motion around the x, y, and z axes can realize various coupled motions of the motions, and accurately simulate the complex ocean motion conditions.

2. The two cooling circuits can slide on the arc-shaped guide rails to change the angle and relative position between the circuits; the resistance adjustment valves on the two cooling circuits can be adjusted to realize the partial loop operation between the circuits; so as to realize the control of different cores, simulating the natural circulation loop of the power system.

3. The pressure tube of the experimental section is connected by an insulating flange, which can avoid being heated by the DC power supply due to the formation of a parallel circuit with the experimental section; the orientation of the pressure tube can be adjusted according to the different forms of motion, reducing the six-degree-of-freedom motion condition The impact of the additional pressure drop.

4. The cooling water system is divided into an outdoor part and an indoor part fixed on the motion simulation platform. While ensuring the cooling capacity, it realizes the motion condition simulation of the entire natural circulation system including cold and heat sources.

These and other objectives, features, and advantages of the present invention will become apparent from the following detailed description, the accompanying drawings, and the appended claims.

DETAILED DESCRIPTION OF THE PREFERRED EMBODIMENT

Figure 1:
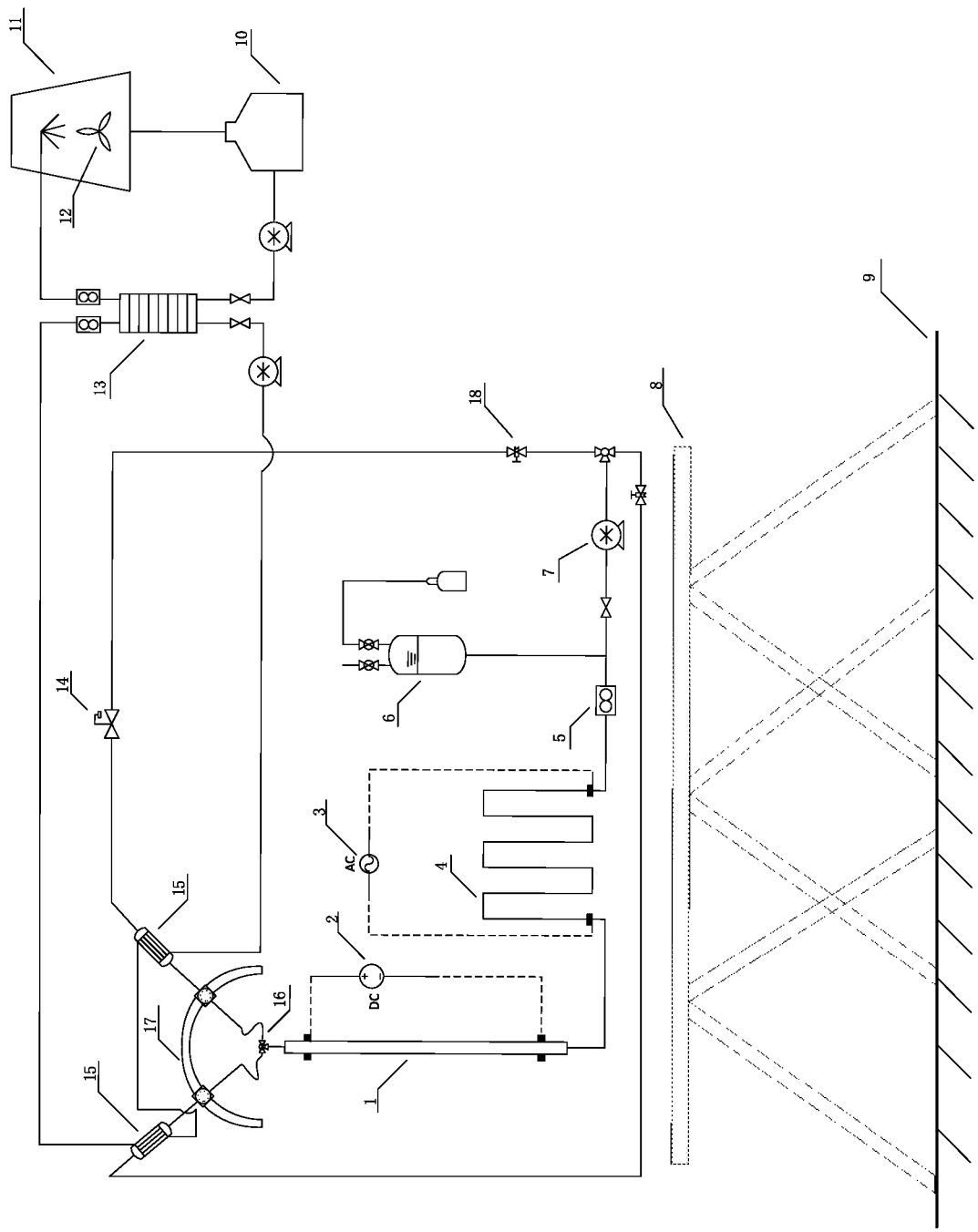
FIG. 1 is a system schematic diagram of the experimental device.

The present invention will be described in detail below in conjunction with the drawings and embodiments:

As shown in FIG. 1, a multi-loop natural circulation experimental device under six-degree-of-freedom motion conditions of the present invention includes a six-degree-of-freedom motion simulation platform, a multi-loop main circulation loop, a cooling water system, and an electric heating system; The degree of freedom motion simulation platform is composed of a mechanical platform, a drive system and a control system; the multi-loop main circulation loop includes a serpentine preheater 4, an experimental section 1, a pressurized circulating pump 7, a voltage stabilizer 6, and an electromagnetic flowmeter 5, exhaust valve 14, two sleeve-tube condensers 15, in which the serpentine preheater 4, the experimental section 1, the pressurized circulating pump 7 is fixed to the mechanical structure of the six-degree-of-freedom motion simulation platform through a truss structure on the platform; arc-shaped guide rails 17 are fixed on the truss structure, and two two sleeve-tube condensers 15 are respectively fixed on the arc-shaped guide rails 17, and the ascending and descending sections of the multi-loop main circulation loop pass through the T-shaped three-way 16 and the hose are respectively connected to the inlet and outlet of the two sleeve-tube condensers 15 to form two cooling circuits of the multi-loop main circulation circuit; the experimental section 1 is connected to the multi-loop main circulation circuit through the rotating insulating flange 22 in the ascending section, the serpentine preheater 4, the ascending section and the descending section are respectively connected by welding, the pressurized circulating pump 7 and the exhaust valve 14 are connected to the entrance of the descending section, and the voltage stabilizer 6 is connected to the entrance of the serpentine preheater 4. Section is connected, the electromagnetic flowmeter 5 is installed at the entrance section of the serpentine preheater 4; the cooling water system consists of two sleeve-tube condensers 15, a plate heat exchanger 13, a cooling tower 11, a cooling fan 12, a cooling water tank 10, and a circulation Pumps and electromagnetic flowmeters; the cooling water channels of the two sleeve-tube condensers 15 are connected in series with stainless steel hoses and connected to the primary side of the plate heat exchanger 13 to form the indoor part of the cooling water system; the plate heat exchanger 13 two The secondary side is connected with the cooling water tank 10 and the cooling tower 11 to form the outdoor part of the cooling water system, and the cooling fan 12 is installed inside the cooling tower 11; the indoor and outdoor parts of the cooling water system are respectively installed with electromagnetic flowmeters, gate valves and circulating pumps; The electric heating system is composed of a DC power supply 2, a low-voltage power controller, and a transformer 3. The DC power supply 2 is fixed on the upper table 8 of the mechanical platform and outputs constant power to the experimental section 1, and the input end of the transformer 3 is connected to the low-voltage power controller, The output end is connected to the serpentine preheater 4, and constant power is output to the preheater 4.

Figure 3:
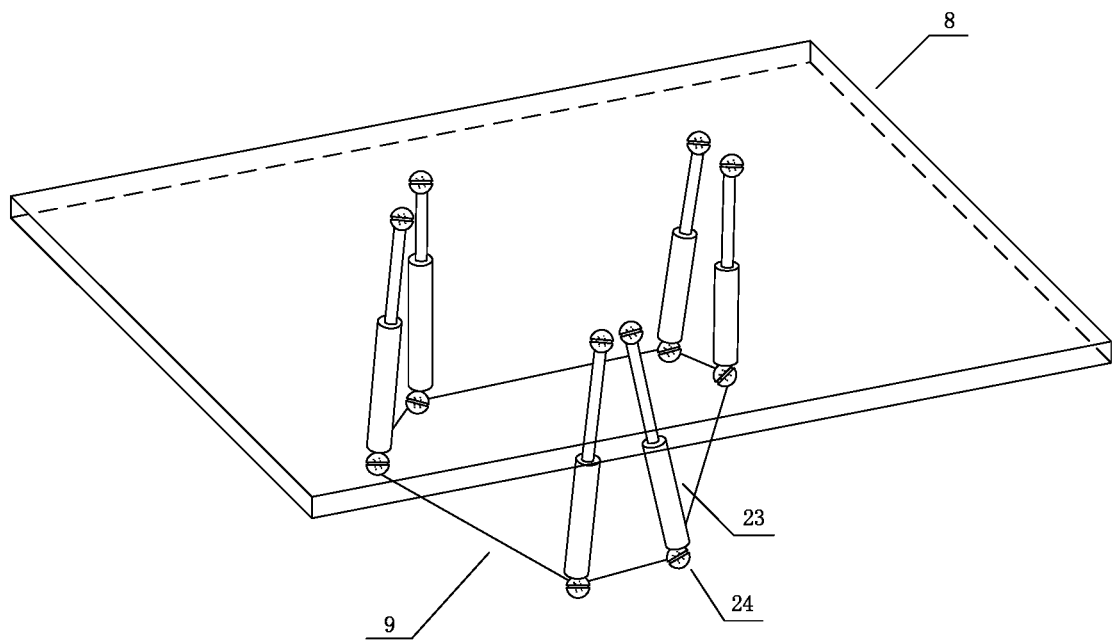
FIG. 3 is a schematic diagram of the motion simulation platform of the experimental device.

As shown in FIG. 3, as a preferred embodiment of the present invention, the mechanical table of the six-degree-of-freedom motion simulation platform includes an upper table 8 and a lower base 9. The drive system includes six telescopic cylinders 23 and joint hinges 24, which are telescopic the cylinder 23 is driven by a servo motor and is arranged in parallel. The two ends are respectively connected to the upper table 8 and the lower base 9 by joint hinges 24; the six-degree-of-freedom movement of the upper table 8 is realized by the telescopic movement of the six telescopic cylinders 23.

According to a preferred embodiment of the present invention, the indoor part of the cooling water system is fixed on a six-degree-of-freedom motion simulation platform, and is connected to the outdoor part through a stainless steel hose. The entire natural circulation experimental device including cold and heat sources is uniform during the experiment.

According to a preferred embodiment of the present invention, the two sleeve-tube condensers 15 can change their orientation on the arc-shaped guide rail 17, thereby changing the angle between the two cooling loops.

According to a preferred embodiment of the present invention, the two cooling circuits are respectively equipped with resistance adjusting valves 18, which can set different resistance working conditions for the two cooling circuits to achieve partial loop operation between the two cooling circuits.

Figure 2:
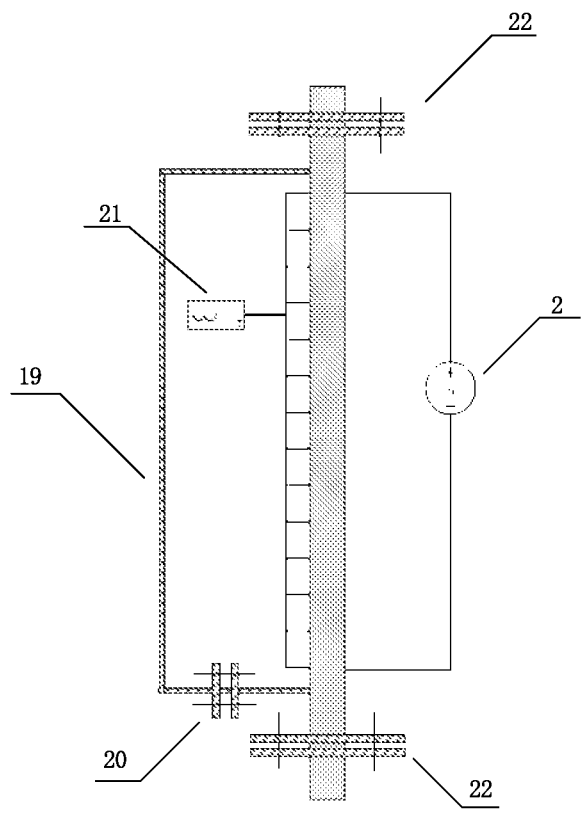
FIG. 2 is a schematic diagram of the experimental section of the experimental device.

As shown in FIG. 2, as a preferred embodiment of the present invention, the experimental section 1 is a circular tube experimental section, which is directly energized and heated by the DC power supply 2, and the power control sensitivity is high; the wall of the experimental section 1 is equidistant every 100 mm A thermocouple 21 is arranged to measure the wall temperature. The thermocouple is inserted in the center of the inlet and outlet to measure the temperature of the fluid to monitor the state of the fluid and the wall surface in the experimental section in real time; It forms a parallel circuit with the experimental section 1 and is heated by the DC power supply 2; the experimental section 1 can rotate the experimental section around its central axis through the rotating insulating flange 22, and change the orientation of the pressure tube 19 according to the different motion forms, reducing The effect of additional pressure drop.

As shown in FIG. 1, the experiment method of the multi-loop natural circulation experimental device under the six-degree-of-freedom motion condition of the present invention, the multi-loop main circulation loop and the cooling water system are filled with water and leak detection before the experiment starts. Pressure resistance test to ensure that the loop does not leak under large flow and high pressure conditions; before the start of the experiment, open the pressurized circulating pump 7 and the exhaust valve 14 to discharge the gas in the multi-loop main loop and keep the multi-loop main loop All working fluids are single-phase water; then close the exhaust valve 14, disconnect the pressurized circulating pump 7, adjust the voltage stabilizer 6, so that the pressure of the multi-loop main circulation loop is the experimental target working condition pressure; adjust the sleeve type. The position of the two sleeve-tube condensers 15 and the resistance adjusting valves 18 of the cooling circuit make the angle and resistance of the two cooling circuits the experimental target conditions; when the cooling water system is turned on, keep the gate valves of the indoor and outdoor parts of the cooling water system open Status, turn on the two parts of the circulating pump, turn on the cooling fan 12 to accelerate the cooling of the fluid in the cooling tower 11; when the electric heating system is turned on, gradually increase the heating power of the experimental section 1 and the preheater 4, and each increase in power guarantees the experimental section 1 The wall temperature rise does not exceed 15° C. After the wall temperature of the experimental section 1 and the flow rate of the multi-loop main circulation loop have stabilized, the next power-up operation will be performed until the inlet fluid temperature of the experimental section 1 reaches the experimental target working condition temperature; open six freedoms When performing a motion simulation platform, ensure that the reference of each telescopic cylinder is calibrated, turn on the power of the drive motor, enter the motion simulation control system, raise the mechanical platform to a certain height, and leave enough space for the subsequent simulation of various motions. The motion simulation of the experimental target motion conditions is carried out.

One skilled in the art will understand that the embodiment of the present invention as shown in the drawings and described above is exemplary only and not intended to be limiting.

It will thus be seen that the objects of the present invention have been fully and effectively accomplished. Its embodiments have been shown and described for the purposes of illustrating the functional and structural principles of the present invention and is subject to change without departure from such principles. Therefore, this invention includes all modifications encompassed within the spirit and scope of the following claims.

What is claimed is:

1. A multi-loop natural circulation experimental device under six-degree-of-freedom motion conditions, comprising: a six-degree-of-freedom motion simulation platform, a multi-loop main circulation loop, a cooling water system, and an electric heating system; wherein:
the six-degree-of-freedom motion simulation platform comprises a mechanical platform, a driving system and a control system;
the multi-loop main circulation loop comprises a serpentine preheater (4), an experimental section (1), pressurized circulating pump (7), a voltage stabilizer (6), an electromagnetic flowmeter (5), an exhaust valve (14), and two sleeve-tube condensers (15); wherein the serpentine preheater (4), wherein the experimental section (1), and the pressurized circulating pump (7) are fixed to the six-degree-of-freedom motion simulation platform through a truss structure on the mechanical platform; arc-shaped guide rails (17) are fixed on the truss structure, and the two sleeve-tube condensers (15) are respectively fixed on the arc-shaped guide rails (17), and an ascending section and a descending section of the multi-loop main circulation loop are respectively connected to an inlet and an outlet of the two sleeve-tube condensers (15) through a T-shaped three-way (16) and hoses, forming two cooling circuits of the multi-loop main circulation loop; the experimental section (1) is connected to the ascending section of the multi-loop main circulation loop through a rotating insulating flange (22), the serpentine preheater (4), the ascending section and the descending section are respectively welded and connected, pressurized circulation pump (7) and the exhaust; the exhaust valve (14) is connected with the entrance of the descending section, the voltage stabilizer (6) is connected with the entrance section of the serpentine preheater (4), and the electromagnetic flowmeter (5) is installed in the entrance section of the serpentine preheater (4);
the cooling water system comprises the two sleeve-tube condensers (15), a plate heat exchanger (13), a cooling tower (11), a cooling fan (12), a cooling water tank (10), a circulating pump, and an electromagnetic flowmeter; wherein two cooling water channels of the two sleeve-tube condensers (15) are connected in series with stainless steel hoses and connected to a primary side of the plate heat exchanger (13) to form an indoor part of the cooling water system; a secondary side of the plate heat exchanger (13) is connected with the cooling water tank (10) and the cooling tower (11) to form an outdoor part of the cooling water system; the cooling fan (12) is installed inside the cooling tower (11); the indoor and outdoor parts of the cooling water system are respectively installed with an electromagnetic flow meters, a gate valve and a circulating pump;
the electric heating system comprises: a DC power supply (2), a low-voltage power controller, and a transformer (3); wherein the DC power supply (2) is fixed on the upper table (8) of the mechanical table and outputs constant power to the experimental section (1), an input end of the transformer (3) is connected with the low-voltage power controller, and the output end is connected with the serpentine preheater (4) to output constant power to the preheater (4).

2. The multi-loop natural circulation experimental device under six-degree-of-freedom motion conditions, as recite in claim 1, wherein the mechanical table of the six-degree-of-freedom motion simulation platform comprises an upper table (8) and a lower base (9); the drive system comprises six telescopic cylinders (23) and joint hinges (24); wherein the telescopic cylinders (23) adopts servo driven by a motor, it is arranged in parallel, and the two ends are respectively connected with the upper table (8) and the lower base (9) through the joint hinges (24); six degrees of freedom movement of the upper table (8) is achieved through the telescopic movement of six telescopic cylinders (23).

3. The multi-loop natural circulation experimental device under six-degree-of-freedom motion conditions, as recite in claim 1, wherein the indoor part of the cooling water system is fixed on a six-degree-of-freedom motion simulation platform and is connected to the outdoor part through a stainless steel hose; the entire natural circulation experimental device including cold and heat sources is in motion during an experiment.

4. The multi-loop natural circulation experimental device under six-degree-of-freedom motion conditions, as recite in claim 1, wherein the two sleeve-tube condensers (15) are capable of changing orientation on the arc-shaped guide rail (17), thereby changing an angle between the two cooling loops.

5. The multi-loop natural circulation experimental device under six-degree-of-freedom motion conditions, as recite in claim 1, wherein the two cooling circuits are respectively equipped with resistance adjusting valves (18), which is capable of setting different resistance working conditions for the two cooling circuits, and realizing partial loop operation between the two cooling circuits.

6. The multi-loop natural circulation experimental device under six-degree-of-freedom motion conditions, as recite in claim 1, wherein the experimental section (1) is a circular tube experimental section, which is directly energized and heated by the DC power supply (2), and the power control sensitivity is high; thermocouples (21) are arranged at equal intervals on the wall surface of the experimental section (1) every 100 mm to measure temperatures of the wall is measured by inserting a thermocouple at the center of the inlet and outlet to measure the temperature of the fluid to monitor the state of the fluid and the wall surface in the experimental section in real time; a pressure-pipe tube (19) set on the experimental section is equipped with an insulating flange (20) to avoid the cause and experiment, the experimental section (1) forms a parallel circuit and is heated by the DC power supply (2); the experimental section (1) is capable of rotating the experimental section around its central axis through a rotating insulating flange (22), and so as to change impulse pressures according to the different forms of motion orientation of the pressure tube (19) to reduce influence of additional pressure drop.

7. An experimental method of the multi-loop natural circulation experimental device under six-degree-of-freedom motion conditions according to claim 1, wherein before start of an experiment, performing water filling leak detection and pressure resistance experiments on the multi-loop main circulation loop and the cooling water system to ensure that the loop does not leak under high flow and high pressure conditions;

before start of the experiment, turning on the pressurized circulating pump (7) and the exhaust valve (14) to exhaust the gas in the multi-loop main circulation loop, and keeping all the working fluids in the multi-loop main circulation loop as single-phase water; then turning off the exhaust valve (14), disconnecting the pressurized circulating pump (7), adjusting the voltage stabilizer (6), so that the pressure of the multi-loop main circulation loop is the experimental target working condition pressure;

adjusting positions of the two sleeve-tube condensers (15) and the resistance adjusting valves (18) of the cooling circuits to make the angle and resistance of the two cooling circuits the experimental target conditions;

when turning on the cooling water system, keeping the gate valves of the indoor and outdoor parts of the cooling water system turned on, respectively turning on the circulating pumps of the two parts, and turning on the cooling fan (12) to accelerate the cooling of the fluid in the cooling tower (11);

while turning on the electric heating system, gradually increasing heating power of the experimental section (1) and the preheater (4) gradually, and each increase in power ensures that the wall temperature rise of the experimental section (1) does not exceed 15° C., after a flow rate of a wall temperature and a multi-loop main circulation loop is stable, performing a next power-up operation until the temperature of the inlet fluid of the experimental section (1) reaches an experimental target working condition temperature; and when turning on the six-degree-of-freedom motion simulation platform, ensuring that a reference of each telescopic cylinder is calibrated, turning on the power of the drive motor, entering the motion simulation control system, and raising the mechanical platform to a certain height to leave enough space for the simulation of various subsequent motions, setting experimental target of motion conditions for motion simulation.

\* \* \* \* \*